July 15, 1952   D. E. MILLER   2,603,556
ROTARY DRUM REACTOR
Original Filed Nov. 18, 1946
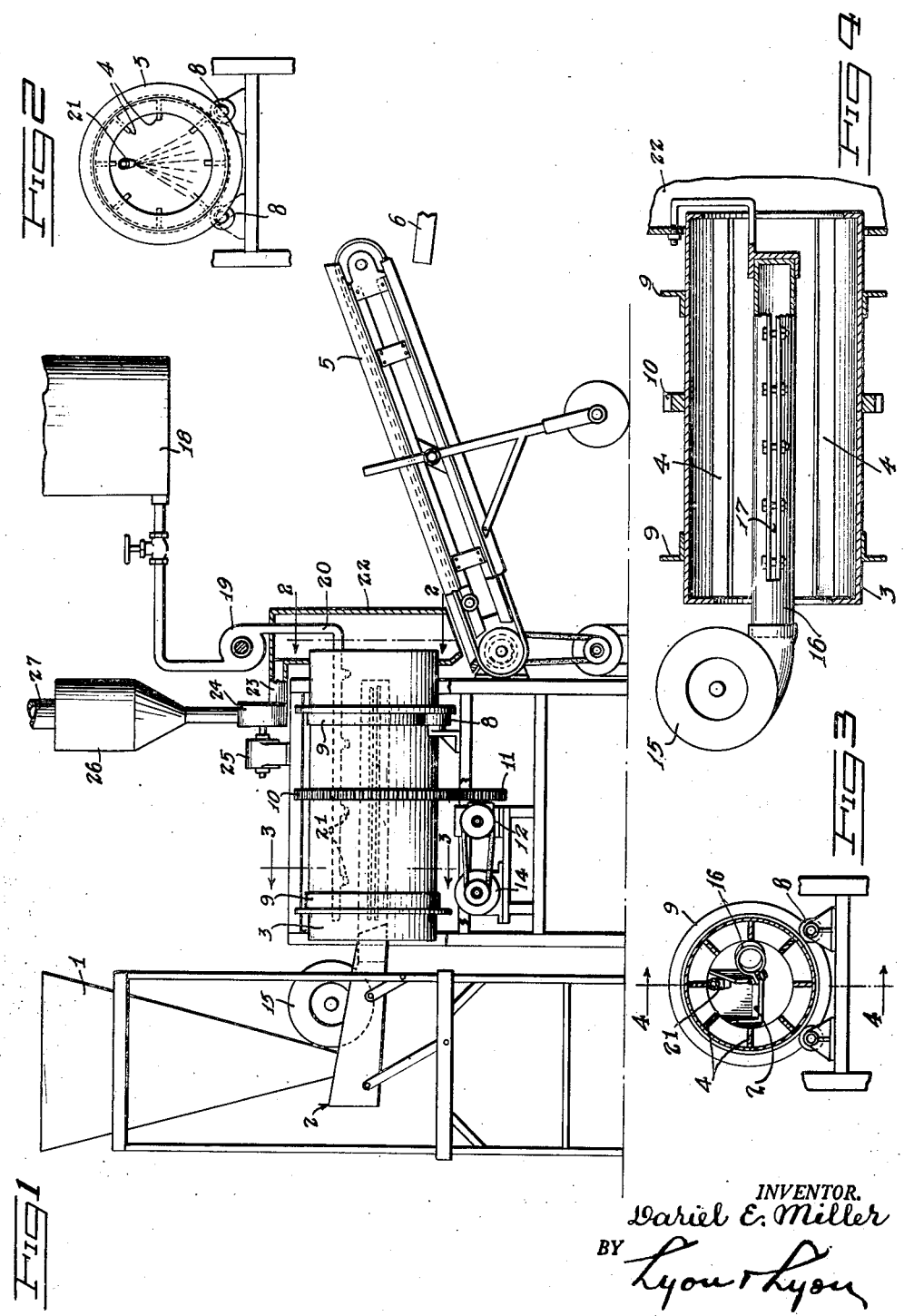
INVENTOR.
Dariel E. Miller
BY Lyon & Lyon
Attorneys

UNITED STATES PATENT OFFICE 2,603,556

ROTARY DRUM REACTOR

Dariel E. Miller, East Los Angeles, Calif., assignor to Kelite Products, Inc., Los Angeles, Calif., a corporation of California Original application November 18, 1946, Serial No. 710,478. Divided and this application December 31, 1948, Serial No. 68,583

3 Claims. (Cl. 23—286)

This invention relates to an apparatus for making chemical compounds, and refers particularly to an apparatus for making trisodium phosphate hypochlorite, but it is also useful for the production of other compounds. The application is a division of my co-pending application, Serial No. 710,478 filed November 18, 1946, now issued as Patent No. 2,536,456. Trisodium phosphate hypochlorite has previously been prepared by crystallizing the compound from solution. The compound has contained trisodium phosphate ($Na_3PO_4$) and sodium hypochlorite (NaOCl) and water in rather an indefinite ratio, but the available chlorine content of the compound obtained has usually been between 3 and 4% on a weight basis. Such a product is of considerable value as a germicide and is used, for example, in cleaning dairies, disinfecting dishes, etc.

It is a general object of the present invention to provide an apparatus for making such trisodium phosphate hypochlorite compound. The apparatus is also useful in the production of other products, particularly in controlling the hydration of such products.

I have discovered that when a solution of sodium hypochlorite is sprayed upon a finely divided, anhydrous or partially hydrated trisodium phosphate compound that molecules of sodium hypochlorite become attached to the trisodium phosphate much in the same manner that water of hydration becomes attached to trisodium phosphate. Accordingly, by spraying sodium hypochlorite solution on anhydrous or partially hydrated trisodium phosphate material, it is possible to produce trisodium phosphate hypochlorite compounds, and this operation can be carried on and controlled without allowing the trisodium phosphate compound to pass into the solution state.

The apparatus of the present invention has therefore been designed to provide for the spraying of hypochlorite solution or other material onto a product, such as trisodium phosphate, under conditions to effect such a reaction. The apparatus of the present invention is designed so that a product may be produced by either a batch operation or a continuous operation. Moreover, the apparatus of the present invention is so designed that a solid product is produced from the apparatus, which is derived in the form of a free-running aggregate.

The apparatus of the present invention is effective for producing trisodium phosphate hypochlorite compounds which contain a higher available chlorine content than similar products which have heretofore been produced by methods and apparatus now in use.

The apparatus of the present invention includes a rotating drum, and means for feeding trisodium phosphate material continuously into one end of the rotating drum and for removing the product of the operation continuously from the other end of the drum, the drum operating to tumble and agitate the trisodium phosphate during the operation of the apparatus. Means are provided in the apparatus for spraying the solution, such as sodium hypochlorite solution, upon the solid compound in the drum, so that such solution may be properly picked up and incorporated in that product. Since the reaction occurring is an exothermic reaction, means are provided to remove this developed heat during the operation of the apparatus. For such purpose, the apparatus includes means for blowing air through the material.

The apparatus of the present invention, together with various further objects and advantages of the invention, will be more fully understood from the following description of the preferred form of the invention, which description is given in connection with the accompanying drawings, in which Figure 1 is an elevation.

Figure 2 is a fragmentary section, taken substantially on the line 2—2 of Fig. 1.

Figure 3 is a similar section taken on the line 3—3 of Fig 1.

Figure 4 is a section on the line 4—4 of Fig. 3.

Referring to the drawings, 1 indicates a hopper for holding the supply of dehydrated or partially hydrated trisodium phosphate. Preferably the material is in a finely divided state capable of passing through a 60 mesh screen and mostly through a 200 mesh screen. From the hopper 1 the material is fed continuously by a feeding device, diagrammatically indicated at 2, into the end of the rotating drum 3. The drum 3 is preferably provided with fins 4 for the purpose of assisting in the tumbling of the trisodium phosphate material as the drum rotates. The drum is preferably positioned on a slight slant towards a discharge conveyor 5 which receives the product and delivers it onto the screen 6.

The rotary drum 3 may be mounted in any suitable manner, such as by rolls 8 engaging the tracks 9 for rotation about its axis and may be driven by a gear 10 which in turn engages the gear 11 driven by a reduction member 12 and by a motor 14.

From the left of the drum, as viewed in Fig. 1, air is forced by a blower 15 into an intake 16 having a variable slot 17 by means of which the air is distributed for the purpose of removing the heated reaction.

During the operation the sodium hypochlorite solution is continuously withdrawn from the tank 18 by a pump 19 and passed through a line 20 which enters the drum 3. Within the drum 3 there is provided a plurality of spray nozzles, such as indicated at 21, by means of which the sodium hypochlorite solution is sprayed upon the trisodium phosphate material in the drum.

The strength of the hypochlorite solution should be adjusted so that when the trisodium phosphate has been substantially completely hydrated it contains about 1 to 5% available chlorine. Complete hydration corresponds to about 12 molecules of water of hydration and various strengths of hypochlorite solution may be utilized in the process, depending upon the extent of hydration of the trisodium phosphate at the start of the process.

The product produced by the process of the present invention is of a somewhat granular, free-running nature; less than 20% of the material being retained on a 14 mesh screen while substantially all of the product is retained on a 100 mesh screen.

An important feature of the apparatus of the present invention is the regulation of the cooling of the material undergoing reaction. Means are provided for continuously cooling the reacting material. Cooling is generally necessary as in the absence of cooling, the absorption of the hypochlorite or other solution, or the solid material may be inhibited, or the solid material may become melted into one lump. In order to carry out the desired cooling, air is blown into the drum continuously during the operation, the air being discharged from the right end of the drum. At the right end of the drum there is provided the hood 22 having a discharge outlet 23, connected with the fan 24, driven by a motor 25 through a separator 26 and hence to the outlet 27.

While the particular form of the apparatus herein described is well adapted for carrying out the objects of the present invention, various modifications and changes may be made, and this invention includes all such modifications and changes that come within the scope of the appended claims.

I claim:

1. An apparatus for producing a chemical product which comprises a drum, means for revolving the drum, means for feeding a solid material into one end of the drum, means for discharging solid products from the other end of the drum, a spray device within the drum for spraying the solution onto material in the drum, and means for cooling the solid material in said drum, said means including an air blower, an air conduit extending within the drum substantially parallel to the axis thereof, and a plurality of spaced-apart discharge outlets from said conduit.

2. An apparatus for producing a chemical product which comprises a drum, means for revolving the drum, means for feeding a solid material into one end of the drum, means for discharging solid products from the other end of the drum, a spray device within the drum for spraying the solution onto material in the drum, and means for cooling the solid material in said drum, said means including a conduit for air leading within the drum substantially parallel to the axis of said drum, said conduit having a longitudinally extending slot for discharge of air within said drum.

3. An apparatus for producing a chemical product which comprises a drum, means for revolving the drum, means for feeding a solid material into one end of the drum, means for discharging solid products from the other end of the drum, a spray device within the drum for spraying the solution onto material in the drum, and means for cooling the solid material in said drum, said means including a conduit for air leading within the drum substantially parallel to the axis of the drum, said conduit having a longitudinally extending slot for discharge of air within said drum, and means for varying the size of the opening of said slot.

DARIEL E. MILLER.

REFERENCES CITED

The following references are of record in the file of this patent:

UNITED STATES PATENTS

| Number | Name | Date |
|---|---|---|
| 658,727 | Naef | Sept. 25, 1900 |
| 773,029 | Reaney, Jr. | Oct. 25, 1904 |
| 1,157,284 | Avram | Oct. 19, 1915 |
| 1,330,495 | Rudge | Feb. 10, 1920 |
| 1,832,148 | Spoerri | Nov. 17, 1931 |
| 1,877,010 | Miscampbell | Sept. 13, 1932 |
| 2,020,098 | Bird | Nov. 5, 1935 |
| 2,223,934 | Barnes et al. | Dec. 3, 1940 |
| 2,375,499 | Shigley | May 8, 1945 |

FOREIGN PATENTS

| Number | Country | Date |
|---|---|---|
| 10,723 | Great Britain | May 9, 1902 |
| 460,999 | France | Dec. 16, 1913 |